(12) United States Patent
Mott et al.

(10) Patent No.: US 8,788,787 B2
(45) Date of Patent: Jul. 22, 2014

(54) SYSTEMS, METHODS AND ARCHITECTURE FOR FACILITATING SOFTWARE ACCESS TO ACCELERATION TECHNOLOGY

(75) Inventors: Michael R. Mott, Elko, NV (US); Evans C. Harrigan, Irvine, CA (US); Heidi E. Ziegler, Marina Del Rey, CA (US); Jamie Douglass, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1338 days.

(21) Appl. No.: 11/070,947

(22) Filed: Mar. 2, 2005

(65) Prior Publication Data
US 2006/0200802 A1 Sep. 7, 2006

(51) Int. Cl.
*G06F 12/06* (2006.01)

(52) U.S. Cl.
USPC .......................................................... 711/202

(58) Field of Classification Search
USPC .......................................... 711/202; 710/305
See application file for complete search history.

(56) References Cited

U.S. PATENT DOCUMENTS

| | | | | |
|---|---|---|---|---|
| 5,245,702 A * | 9/1993 | McIntyre et al. | ............. | 345/541 |
| 5,937,179 A * | 8/1999 | Swoboda | ........................ | 716/16 |
| 6,457,111 B1 * | 9/2002 | Howard et al. | ............... | 711/170 |
| 7,475,000 B2 | 1/2009 | Cook et al. | | |
| 2003/0229482 A1 * | 12/2003 | Cook et al. | ...................... | 703/14 |

OTHER PUBLICATIONS

PCI Special Interest Group, PCI Local Bus Specification, Production Version, Revision 2.1, pp. 1, 2, 185-200, Jun. 1, 1995.*
Cooper, Clark, "Expat Function Reference" Sep. 1, 1999 O'Reill [retrieved on Oct. 20, 2009]. Retrieved from the Internet:< URL:http://www.xml.com/pub/a/1999/09/expat/reference.html>.*
PCT Int'l Search Rpt PCT/US2006/006008, Jun. 2, 2006, The Boeing Co.
PCT Written Opinion PCT/US2006/006008, Jun. 2, 2006, The Boeing Co.
PCI Special Interest Group, PCI Local Bus Specification, Production Version, Revision 2.1, pp. 1-282, Jun. 1, 1995.
PCT International Search report PCT/US2006/006008, dated Jun. 2, 2006, 1 page.
PCT Written opinion PCT/US2006/006008, dated Sep. 2, 2007, 6 pages.

* cited by examiner

*Primary Examiner* — Kenneth Lo
(74) *Attorney, Agent, or Firm* — Yee & Associates, P.C.

(57) ABSTRACT

Systems and methods allow access between a software application residing within a processor module and an accelerator module having an accelerator address space distinct from the processor address space. Access to the accelerator is provided by mapping the accelerator address space to an associated portion of the processor address space. The association may be made based upon a description of the accelerator address space provided in a pre-determined format. The formatted description is processed to create a software indicator module that is provided to the user application to thereby indicate the associated portion of the processor address space. Access to the associated portion of the processor address space by the software program is redirected to the accelerator address space to thereby allow the application to access the accelerator. A functional interface that allows the software application to issue commands and perform other administrative functions on the accelerator module may also be provided.

27 Claims, 2 Drawing Sheets

```
<?xml version="1.0" ?>
<memoryMappingPolicy>
 <typeDef name="int">
   s_int_32
 </typeDef>
</memoryMappingPolicy>
```

```
<?xml version="1.0" ?>
<block name="x"
itemType="int" length="16"/>
```

SYSTEMS, METHODS AND ARCHITECTURE FOR FACILITATING SOFTWARE ACCESS TO ACCELERATION TECHNOLOGY

TECHNICAL FIELD

The present invention generally relates to high performance computing, and more particularly relates to systems and methods for allowing software applications to access features provided in hardware and other acceleration modules.

BACKGROUND

As computing devices become increasing ubiquitous in personal, industrial, corporate and governmental settings, the interoperability between the various computers and other data processing devices becomes increasingly important. In aerospace, homeland security and defense settings, for example, increasing emphasis is being placed upon "network centric operations" that leverage information-sharing between aircraft, vehicles, command centers, robotic devices and/or human-operated computing devices to accomplish a desired task such as identifying a target, gathering intelligence data, engaging an enemy or the like. As a result, future defense and aerospace technologies will be increasingly reliant upon information sharing and interoperability between widely differing computing systems. Similar emphasis on interoperability between disjoint systems is occurring in aerospace, industrial and other settings, as well as in the commercial marketplace.

While several robust technologies effectively support data sharing and other forms of interoperability between certain types of computers, these commercial off-the-shelf (COTS) products are primarily oriented toward personal computing or commercial enterprise environments. As a result, most COTS interoperability products do not support certain features commonly found in specialized defense, homeland security and aerospace systems. In particular, many defense and aerospace systems operate in environments that can impose significant spatial, electrical and weight restrictions. As a result, many of such systems use dense computing techniques to produce significant computing capability even when limited space, volume or power is available. In the aerospace field in particular, hard real-time processing capabilities such as digital signal processors (DSPs), field programmable gate arrays (FPGAs) and the like have been widely adopted. While dense computing and hard real-time technologies can provide significant computational ability within the established environmental constraints, these specialized features can be difficult to integrate into a large inter-network suitable for network centric operations and the like.

Accordingly, it is desirable to create a framework that allows systems having specialized processing capabilities to readily integrate into a larger operating environment without sacrificing access to the specialized capabilities. In addition, it is desirable to adopt COTS interoperability solutions in non-traditional settings to enable network centric operation and the like. Furthermore, other desirable features and characteristics will become apparent from the subsequent detailed description and the appended claims, taken in conjunction with the accompanying drawings and this background section.

BRIEF SUMMARY

According to various exemplary embodiments, systems and methods allow access between a software application residing within a processor module and an accelerator module having an accelerator address space distinct from the processor address space. Access to the accelerator is provided by mapping the accelerator address space to an associated portion of the processor address space. The association may be made based upon, for example, a description of the accelerator address space provided in a pre-determined format, such as a format based upon extensible markup language (XML) or the like. The formatted description is processed to create a code module that can be accessed by the software application to identify the associated portion of the processor address space. Access to the associated portion of the processor address space by the software program is redirected to the accelerator address space to thereby allow the application to access the accelerator. Various further embodiments additionally or alternatively allow the software application to issue commands and perform other administrative functions on the accelerator module.

BRIEF DESCRIPTION OF THE DRAWING FIGURES

Exemplary embodiments of the present invention will hereinafter be described in conjunction with the following drawing figures, wherein like numerals denote like elements, and FIG. 1 is a block diagram of an exemplary system that allows a software application on a controller module to access an acceleration module;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, software applications are able to access features provided by an accelerator module even though the accelerator operates under a separate memory/address space from the application. To obtain this access, some or all of the accelerator address space is appropriately mapped to an associated portion of the address space that is accessible by the software application. The application receives a software indicator module that designates the portions of the address space associated with the accelerator. Subsequent requests for access to the associated portion of the address space are then redirected to the accelerator as appropriate. Moreover, various functions of the accelerator may be accessed though procedure calls or the like. In a further embodiment, the mapping and indication features described above can be produced from a description of the accelerator address space. This description may be provided, for example, received in a pre-determined format (e.g. an XML schema or document, as described below) that can be processed to generate the indicator module described above. In a still further embodiment, the indicator module is produced in a format that is readily accessible by the software application, thereby allowing for adoption in various general-purpose software environments that are well-suited for interoperability applications. As a result, network centric applications and the like may be built using general-purpose languages and features without sacrificing access to specialized resources provided by accelerator modules.

Figure 1:
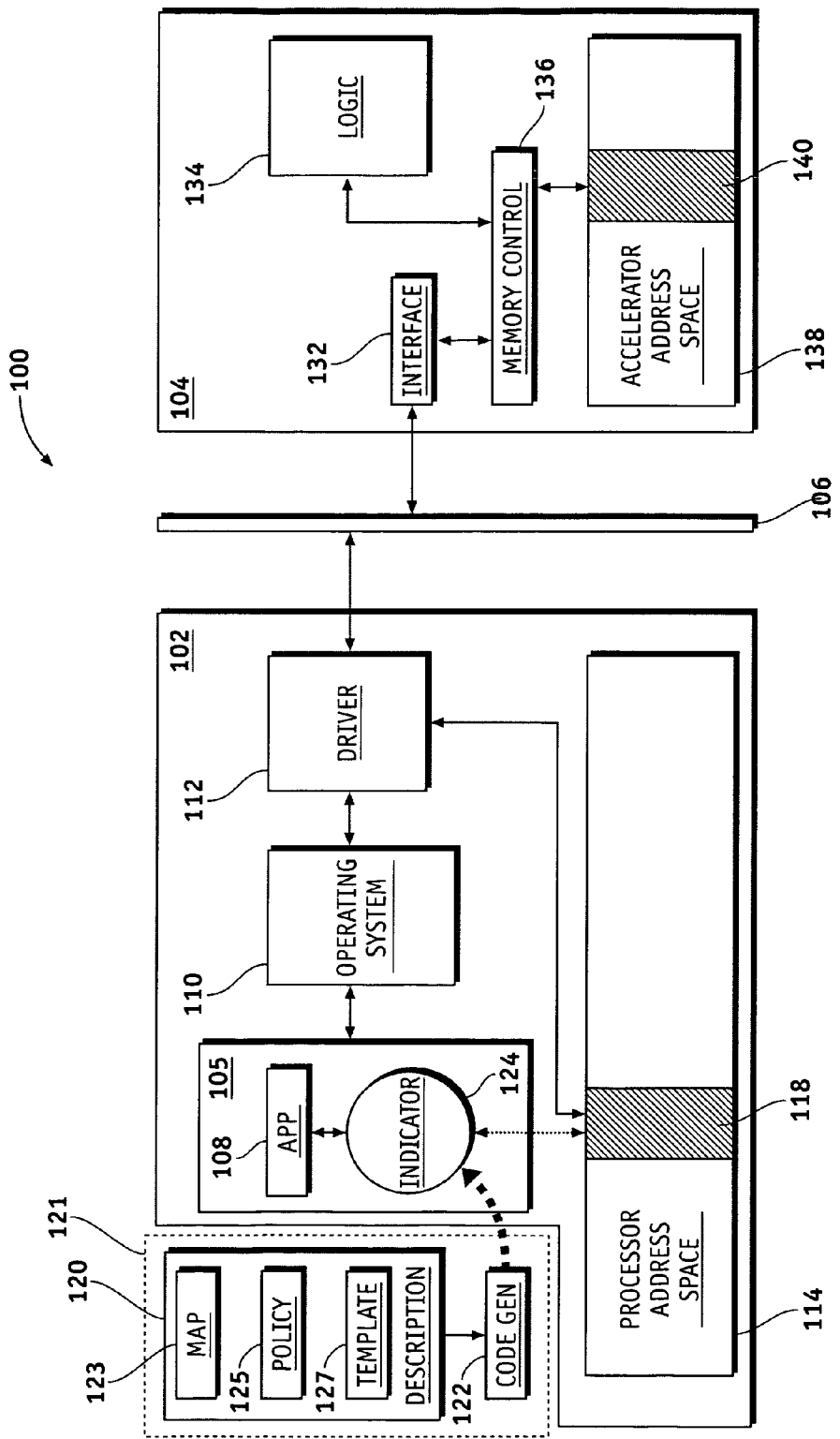

Turning now to the drawing figures and with initial reference to FIG. 1, an exemplary processing device/system 100 suitably includes a controller module 102 and an accelerator module 104 communicating via an interface 106. Software applications 108 executing within an execution environment 105 on controller module 102 are able to access logic 134 in accelerator module 104 through a re-mapping of accelerator address space 138 to a portion 118 of processor address space 114 as appropriate. This re-mapping is described by indicator module 124, which is compatible with application 108 and/or environment 105 such that subsequent communications between the associated portion 118 of processor address space 114 and application 108 are redirected to accelerator module 104. In various further embodiments, indicator module 124 is generated by a code generation module 122 based upon a description 120 of accelerator address space 138.

Controller module 102 is any device, component, system, board or other module capable of processing data. In various exemplary embodiments, controller module 102 is a personal computer, microcontroller board, processing card or other module conventionally found in any computing environment. Controller module 102 generally includes a processor executing an operating system 110 and any number of software applications 108. Controller module 102 may optionally execute applications 108 within a language execution environment 105 or other runtime environment, although this environment is not necessary in all embodiments. The various components of controller module 102 (e.g. memory, input/output devices, communications devices and/or other components) suitably communicate via processor address space 114 as appropriate.

Accelerator module 104 is any hardware device, software application, processing component or other module capable of performing one or more computing tasks in communication with controller module 102. In various exemplary embodiments accelerator module 104 includes a digital signal processor (DSP), field programmable gate array (FPGA), programmed array logic (PAL), application specific integrated circuit (ASIC), programmed microcontroller, lookup table or other computing resource to allow rapid execution of one or more specialized tasks on behalf of controller module 102. Examples of various tasks may include, without limitation, image or signal processing, data compression or encryption, digital encoding or decoding and the like. Accelerator module 104 suitably includes appropriate hardware and/or software logic 134 for performing the appropriate task(s), and may additionally include a memory controller 136 or other control mechanism for transferring data and instructions between data interface 132, logic 134 and/or any digital memory locations 140 via an accelerator address space 138.

Interface 106 is any hardware and/or software interface capable of conveying communications between controller module 102 and accelerator module 104. In various exemplary embodiments, interface 106 is a bus, although alternate embodiments may be implemented with a local area network or other connection, or with any other hardwired or wireless connection. Examples of conventional buses include the peripheral component interconnect (PCI) bus, PCIX bus, various types of VME buses, INFINIBAND bus, uniform serial bus (USB), IEEE 1394 buses, and the like.

Software application 108 is any program, applet, script, or other software element in source or object code form. Application 108 may be implemented using any compiled, interpreted and/or other programming environment or the like, including any high or low level programming or scripting languages. In various exemplary embodiments, application 108 is implemented using a language execution environment 105 that provides run-time support, network and other services, and/or other features as appropriate. One example of an execution environment 105 is the JAVA framework using products and services available from Sun Microsystems of Mountain View, Calif., although equivalent embodiments could utilize the .NET products and services available from Microsoft Corporation of Redmond, Wash., as well as any other programming tools, languages, components or the like. In the exemplary system 100 shown in FIG. 1, one or more applications 108 suitably interact with various services 105 to obtain access to available computing resources and features at compile and/or run time. Examples of services available in a conventional computing implementation 105 may include document formatting or parsing, access to data networks or other input/output devices, access to specialized programming or processing routines and the like. These services may alternately be provided by operating system 110 directly, or indirectly through a virtual machine or other abstraction as appropriate. JAVA implementations of programming environment 105, for example, may provide various JAVA services, as well as a JAVA virtual machine and services layer adapter features that could be modified or supplemented as appropriate to provide access to accelerator module 104.

As briefly mentioned above, application 108 suitably accesses and communicates with accelerator module 104 using indicator module 124. Although the processor space 114 is distinct from the accelerator address space 138, for transfers of data between application 108 and accelerator 104, a portion 118 of processor address space 114 can be associated with some or all of accelerator address space 138, as appropriate. Indicator module 124 suitably identifies associated portion 118 in a manner that is useable by application 108. From the perspective of application 108, then, access to accelerator module 104 is obtained by placing read/write requests or other communications to the associated address portion 118 identified in module 124. In an implementation using the JAVA framework 105, for example, identifier module 124 may be appropriately formatted as a JAVA object or class construct that is compatible with applications 108 written in the JAVA, JAVASCRIPT or other programming languages. Applications 108 in such embodiments may therefore interact with the accelerator 104 using conventional "setX1( )" and "getX1( )" syntax to write and read to the addresses in associated portion 118. Similar concepts may be applied in other programming environments as appropriate.

Communications between application 108 and associated address space 118 are appropriately recognized and redirected to accelerator 104 by operating system 110 and/or device driver module 112 as appropriate. Device driver 112 is any hardware and/or software module capable of communicating with accelerator module 104. In various embodiments, driver module 112 is a software device driver configured in accordance with the specifications of operating system 110 and/or environment 105 to perform memory addressing and/or device driver functions as appropriate. In various embodiments, application 108 suitably receives the actual addresses 118 of memory locations managed by device driver 112 from operating system 110 at startup or initialization. Using the memory mapping information contained in indicator 124, application 108 is able to communicate with addresses 118 to place data and/or to receive data from associated addresses 140 on accelerator 104. In such embodiments, driver 112 suitably responds to requests by application 108 for access to associated portion 118, and processes such requests in the appropriate manner. Alternatively, access requests by application 108 to memory/address space 118 can be configured within operating system 110 to generate interrupts or the like to device driver 112, which then processes the access request as appropriate. Similarly, processing functions within logic 134 may be directly accessed by application 108 using procedure calls or the like to device driver 112. These procedure calls may be transmitted directly by operating system 110, as appropriate, and processed by device driver 112 to carry out the desired function on accelerator 104.

In various further embodiments, indicator module 124 is manually or automatically generated from a description 120 of some or all of accelerator address space 138. Description 120 suitably describes the data and/or instruction interface between application 108 and accelerator 104 using any appropriate terminology and syntax. Description 120 may be in electronic form, and may be formatted according to any standard or non-standard format. In various embodiments, description 120 is formatted as a document, template or schema in accordance with the extensible markup language (XML), although any other format could be used in other embodiments. Description 120 may alternatively include a mapping policy document 125 (e.g. an XML document or schema) that defines data types and other aspects of a memory mapping policy, along with a separate actual mapping document 123 (e.g. an XML document) formatted in accordance with the template that defines the actual layout map for the interface. The mapping policy set forth in description 120 may include, for example, named memory blocks of particular sizes or data types that can be used to define the interface between application 108 and accelerator 104.

In still further embodiments, a code generation module 122 may be used to automatically process description 120 as appropriate to create indicator module 124. Such processing may variously include establishing a mapping between accelerator address space 138 and the associated portion 118 of controller address space 114, as well as binding the mapped address space 118 to indicator module 124 as appropriate. This mapping and/or binding suitably creates appropriate linkages between the associated portion 118 of the processor address space 114 and device driver 112 in accordance with the policies and operations of operating system 110 and/or the operating environment 105 of application 108, as described more fully below. These linkages can then be contained within indicator module 124, which is appropriately formatted in a manner that is compatible with applications 108 and/or execution environment 105. This format may be based upon a template 127 provided to code generation module 122 that provides the attributes desired in a particular indicator 124, for example, and/or may be formatted in any standard or non-standard manner. Code generation module 124 may be implemented with any suitable pre-compiler or other programming tool. In implementations using JAVA constructs, for example, the JAXB tool available from Sun Microsystems could be used to parse an XML description 120 to thereby create indicator module 124 as a JAVA class, object, "hardware bean" or other construct suitable for use in JAVA applications 108. Other embodiments, however, may use widely differing tools, formats and syntax without departing from the concepts set forth herein.

It is not necessary that description 120 and/or code generation module 122 be present in all embodiments. To the contrary, indicator module 124 may be created according to any technique, and may be provided from any source that is internal or external to controller 102, such as a separate development platform 121 or the like. After indicator module 124 is created for a particular interface, for example, copies of indicator module 124 may be provided to other systems 100 and/or controllers 102 that have similar interfaces without the need for each of these additional devices to generate a separate indicator 124. As a result, description 120 and code generator module 122 may be found within certain implementations (e.g. development or design environments 120), but may not be necessarily present in all operational products using the concepts set forth herein.

In operation, then, the various applications 108 and other services provided within environment 105 suitably interact with device driver 112 to interface with accelerator 104 using the mapping policy contained within indicator module 124. As a result, applications 108 may be created using any of the available services in environment 105 without sacrificing access to accelerator 104. Applications 108 created within framework 105 may therefore readily incorporate features that allow for network centric and other operations based upon interoperability.

Figures 2, 3, 4:
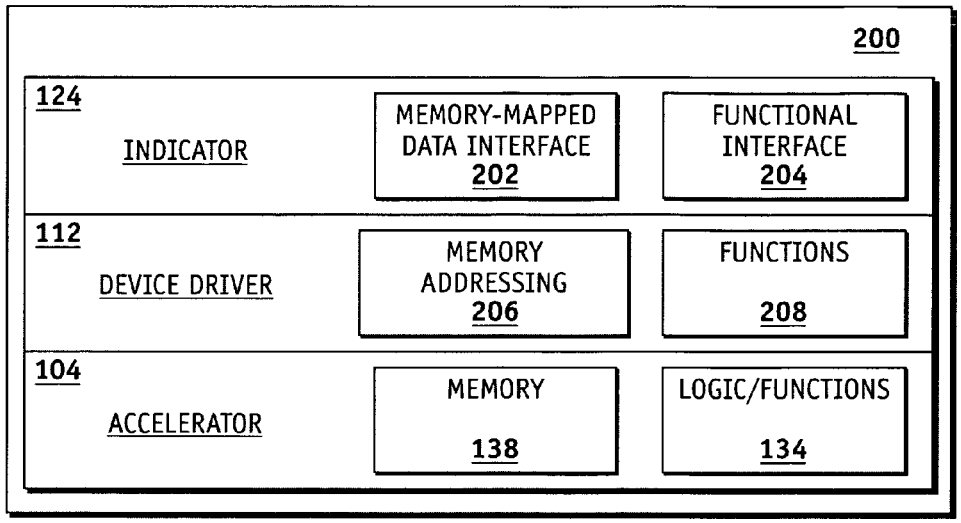
FIG. 2 is a block diagram of an exemplary layered software architecture for allowing software access to acceleration resources.
FIG. 3 is a portion of an exemplary mapping policy.
FIG. 4 is a portion of an exemplary memory layout specification.

FIG. 2 shows an exemplary layered architecture view 200 of system 100 described above. This architecture 200 could also be used to implement a service (e.g. a "web service" or the like within environment 105) that could be accessed by applications 108 running on controller 102, or elsewhere within a network centric environment. With reference to FIG. 2, access to accelerator 104 is provided by device driver 112 using the information contained within indicator module 124 as described above. Indicator module 124 suitably contains appropriate interfaces for data 202 and instructions 204 in a format that is compatible with applications 108 and/or environment 105 (FIG. 1). In embodiments wherein indicator module 124 is implemented as a JAVA class construct, for example, New Input/Output (NIO) syntax could be used to describe data interface 202 and/or Java Native Interface (JNI) syntax could be used to describe a functional/command interface 204, although other techniques and formats could be used across a wide array of alternate embodiments.

Data interface 202 suitably provides for data transfer between application 108 and accelerator 104 as appropriate. In various embodiments, data interface 202 communicates with device driver 112 using the address re-direction techniques described above and below. As such, applications 108 suitably exchange data with accelerator 104 by accessing associate memory portion 118 (FIG. 1) in any manner (e.g. using conventional "set" and "get" syntax in a JAVA application). Driver 112 then exchanges data between the associated portion 118 and address space 138 of accelerator 104 via interface 106 (FIG. 1). As stated above, driver 112 may be configured to process and/or monitor any access to associated portion 118 by applications 108, and/or may be configured to respond to interrupts generated by operating system 110 in response to access to associated portion 118 as appropriate. Memory addressing features are shown in FIG. 2 as block 206.

Optional functional interface 204 similarly provides a mechanism for issuing commands or instructions (e.g. load new logic, provide status info, etc.) to accelerator 104. These instructions are typically executed by routines 208 within device driver 112, which interact with logic 134 or other components of accelerator 104 as appropriate. These instructions may be executed in any manner, such as through a procedure call or other message passed from application 108 through operating system 110 to device driver 112. Function interface 204 need not be implemented in the same manner as data interface 202, and therefore need not make use of the memory association scheme described above. In various embodiments, however, indicator module 124 suitably contains routines, memory maps and/or other syntax (e.g. in JNI format) that allows application 108 to interact with functional interface 204 to control or otherwise affect the processing of accelerator 104.

FIGS. 3 and 4 show examples of code structures written in the XML language that could be used to implement exemplary portions of a mapping policy. As described above, description 120 (FIG. 1) may be implemented in any manner to create indicator module 124. FIG. 3 is an exemplary portion 300 of an XML document that could be used in a mapping policy document (e.g. policy 125 in FIG. 1) for defining data types and other aspects of a mapping policy. The code shown in FIG. 3, for example, defines a data type "int" as being a signed integer that is thirty-two bits in length (corresponding to four conventional data bytes). The exemplary map portion 400 shown in FIG. 4 expands upon the policy portion shown in FIG. 3 by reserving a particular block of memory (named "x") containing sixteen instances of type "int", as defined above. The resulting memory layout would therefore reserve sixteen memory "ints" to make up block "x". This block could be used for storing a particular type of data, for example, or for any other purpose. Similar constructs could be used to describe the entire interface between controller 102 and accelerator 104, resulting in a mapping system that is flexible yet effective. Again, the description 120 of the interface and/or associated portion 118 may be defined in any manner, using any number of documents, schemas, templates and/or the like.

Various exemplary structures, systems and techniques have therefore been described that allow software applications to utilize specialized acceleration features such as DSPs, FPGAs, ASICs and the like. Because the above-described concepts may be implemented across a variety of conventional and non-conventional environments, they may be readily incorporated into certain COTS and other products to create a framework for interoperability without sacrificing acceleration functionality, even in very specialized systems and environments such as those commonly found in the defense and aerospace fields.

While at least one exemplary embodiment has been presented in the foregoing detailed description, it should be appreciated that a vast number of alternate but equivalent variations exist. Although the systems and techniques described herein are frequently described with respect to XML and JAVA technologies, for example, similar concepts could be readily applied to any other software languages, formats, environments, protocols and the like. Similarly, the invention is not limited to embodiments in the fields of aerospace, defense or network centric operations, but rather may be broadly implemented across a range of personal, corporate, industrial, governmental or other settings. While the foregoing detailed description will provide those skilled in the art with a convenient road map for implementing an exemplary embodiment of the invention, it should be appreciated that the embodiments described above are only examples, and are not intended to limit the scope, applicability, or configuration of the invention in any way. To the contrary, various changes may be made in the function and arrangement of elements described without departing from the scope of the invention as set forth in the appended claims and their legal equivalents.

What is claimed is:

1. A method of facilitating access, by a user application, to a specialized function provided by an accelerator module, the user application residing within a controller module having a processor address space, and the accelerator module having an accelerator address space that is distinct from the processor address space, the method comprising:

receiving, by the controller module, a description of the accelerator address space in a predetermined first format, the predetermined first format being an extensible markup language (XML) format;

the received description including a mapping policy, the mapping-policy being in the predetermined first format, the mapping policy defining a data type and a number of bits associated with the data type;

processing the received description of the accelerator address space to create a mapping between the accelerator address space and an associated portion of the processor address space based upon the received description, processing the received description comprising parsing the received description of the accelerator address space to ensure a compliance with the mapping policy;

generating a software indicator module that includes interfaces for data and that comprises software code that includes instructions that are in a second format different from the predetermined first format and that are compatible with the user application, the software indicator module containing linkages, created by the mapping, between the accelerator address space and the associated portion of the processor address space, and containing routines and memory maps that allow the user application to interact with functional interfaces to control and affect processing of the accelerator module; and providing the software indicator module to the user application, the software indicator module identifying the associated portion of the processor address space to the user application, the user application being enabled to access the accelerator address space by communicating to the associated portion of the processor address space, and the user application being enabled to access the specialized function provided by the accelerator module by communicating to the associated portion of the processor address space.

2. The method of claim 1 wherein the software indicator module comprises an object class.

3. The method of claim 1 wherein the software indicator module comprises an object.

4. The method of claim 1 wherein the software indicator module comprises a JAVA hardware bean.

5. A system for facilitating access, by a user application, to a specialized function provided by a hardware accelerator, the user application residing within a controller module having a processor address space, and the hardware accelerator having an accelerator address space that is distinct from the processor address space, the system comprising:

means for receiving a description of the accelerator address space in a predetermined first format, the predetermined first format being an extensible markup language (XML) format;

the received description including a mapping policy, the mapping policy being in the predetermined first format, the mapping policy defining a data type and a number of bits associated with the data type;

means for processing the received description of the accelerator address space to create a mapping between the accelerator address space and an associated portion of the processor address space based upon the received description, processing the received description comprising parsing the received description of the accelerator address space to ensure a compliance with the mapping policy;

means for generating a software indicator module that includes interfaces for data and that comprises software code that includes instructions that are in a second format different from the predetermined first format and that are compatible with the user application, the software indicator module containing linkages, created by the mapping, between the accelerator address space and the associated portion of the processor address space, and containing routines and memory maps that allow the user application to interact with functional interfaces to control and affect processing of the hardware accelerator; and means for providing the software indicator module to the user application, the software indicator module identifying the associated portion of the processor address space to the user application, the user application being enabled to access the accelerator address space by communicating to the associated portion of the processor address space, and the user application being enabled to access the specialized function provided by the hardware accelerator by communicating to the associated portion of the processor address space.

6. A method of facilitating access between a user application and a hardware accelerator, the user application residing within a controller module having a processor address space, and the hardware accelerator having an accelerator address space distinct from the processor address space, the hardware accelerator having a specialized function, the method comprising:

mapping the accelerator address space to an associated portion of the processor address space based on a received description of the accelerator address space, the received description of the accelerator address space being in a predetermined first format, the predetermined first format being an extensible markup language (XML) format, the received description including a mapping policy, the mapping policy being in the predetermined first format, the mapping policy defining a data type and a number of bits associated with the data type, and the mapping comprising parsing the description of the accelerator address space to ensure a compliance with the mapping policy;

identifying the associated portion of the processor address space to the user application using a software indicator module, the software indicator module including interfaces for data and comprising software code that includes instructions that are in a second format that is readable by the user application and is different than the predetermined first format, the software indicator module containing linkages, created by the mapping, between the accelerator address space and the associated portion of the processor address space, and containing routines and memory maps that allow the user application to interact with functional interfaces to control and affect processing of the hardware accelerator, the user application being enabled to access the accelerator address space by communicating to the associated portion of the processor address space, and the user application being enabled to access the specialized function provided by the hardware accelerator by communicating to the processor address space; and directing access to the associated portion of the processor address space to the accelerator address space.

7. The method of claim 6 wherein the XML format comprises an XML schema.

8. The method of claim 6 wherein the XML format comprises an XML document.

9. The method of claim 6 wherein the XML format is described in a template separate from the description.

10. The method of claim 6 wherein the software indicator module comprises an object class.

11. The method of claim 10 wherein the object class is a JAVA object class.

12. The method of claim 6 further comprising the step of executing the specialized function on the hardware accelerator in response to a function call initiated by the user application.

13. A system comprising:

a controller module having a processor address space and a memory having data and computer-executable instructions stored thereon, the computer-executable instructions comprising a user application;

a hardware accelerator that provides a specialized function, the hardware accelerator having an accelerator address space that is distinct from the processor address space;

a first software module within the controller, the first software module being configured to receive a description of the accelerator address space in a predetermined first format, the predetermined first format being an extensible markup language (XML) format;

the description including a mapping policy, the mapping policy being in the predetermined first format, the mapping policy defining a data type and a number of bits associated with the data type;

a second software module within the controller, the second software module being configured to process the received description of the accelerator address space to create a mapping between the accelerator address space and an associated portion of the processor address space based upon the received description, processing the received description comprising parsing the description of the accelerator address space to ensure a compliance with the mapping policy;

a third software module within the controller, the third software module including interfaces for data and comprising software code that includes instructions that are in a second format different from the predetermined first format and are compatible with the user application, the third software module being configured to contain linkages, created by the mapping, between the accelerator address space and the associated portion of the processor address space, and containing routines and memory maps that allow the user application to interact with functional interfaces to control and affect processing of the hardware accelerator; and a fourth software module within the controller, the fourth software module being configured to provide the software indicator module to the user application, the software indicator module identifying the associated portion of the processor address space to the user application, the user application being enabled to access the accelerator address space by communicating to the associated portion of the processor address space, and the user application being enabled to access the specialized function provided by the hardware accelerator by communicating to the processor address space.

14. The system of claim 13 wherein the fourth software module is further configured to execute the specialized function on the hardware accelerator in response to a function call initiated by the user application.

15. The system of claim 13 wherein the hardware accelerator comprises a field programmable gate array (FPGA).

16. The system of claim 13 wherein the hardware accelerator comprises a digital signal processor (DSP).

17. The system of claim 13 wherein the hardware accelerator comprises an application specific integrated circuit (ASIC).

18. A system facilitating access between a JAVA application and a hardware accelerator, the JAVA application residing within a controller module having a digital memory and a processor address space, the hardware accelerator having an accelerator address space that is distinct from the processor address space, the system comprising:

a processing module stored on the digital memory configured to receive a description of the accelerator address space in a predetermined first format, the predetermined first format being an extensible markup language (XML) format, the description including a mapping policy, the mapping policy being in the predetermined first format, the mapping policy defining a data type and a number of bits associated with the data type, and to process the received description of the accelerator address space to create a mapping between the accelerator address space and an associated portion of the processor address space based upon the received description, processing the received description comprising parsing the description of the accelerator address space to ensure a compliance with the mapping policy;

a JAVA component produced by the processing module and stored in the digital memory, the JAVA component including interfaces for data and comprising software code that includes instructions that are in a second format different from the predetermined first format and that are compatible with the JAVA application, the JAVA component being configured to contain linkages, created by the mapping, between the accelerator address space and the associated portion of the processor address space, and containing routines and memory maps that allow the user application to interact with functional interfaces to control and affect processing of the hardware accelerator, the JAVA component identifying the associated portion of the processor address space to the JAVA application, the JAVA application being enabled to access the accelerator address space by communicating to the associated portion of the processor address space, and the user application being enabled to access the specialized function that is provided by the accelerator module, the JAVA application being enabled to access the specialized function provided by the accelerator module by communicating to the processor address space; and a device driver module executable within the digital memory of the controller module, the device driver module being configured to redirect the associated portion of the processor address space to the accelerator address space.

19. The system of claim 18 wherein the hardware accelerator comprises a field programmable gate array (FPGA).

20. The system of claim 18 wherein the hardware accelerator comprises a digital signal processor (DSP).

21. The system of claim 18 wherein the hardware accelerator comprises an application specific integrated circuit (ASIC).

22. The method of claim 1, wherein the specialized function comprises one of document formatting, document parsing, access to data networks, access to input/output devices and access to specialized programming routines.

23. The method of claim 6, wherein the specialized function comprises one of document formatting, document parsing, access to data networks, access to input/output devices and access to specialized programming routines.

24. The system of claim 13, wherein the specialized function comprises one of document formatting, document parsing, access to data networks, access to input/output devices and access to specialized programming routines.

25. The method of claim 1, wherein the communicating to the associated portion of the processor address space comprises a read/write request to the associated portion of the processor address space.

26. The method of claim 6, wherein the communicating to the associated portion of the processor address space comprises a read/write request to the associated portion of the processor address space.

27. The system of claim 13, wherein the communicating to the associated portion of the processor address space comprises a read/write request to the associated portion of the processor address space.

* * * * *